July 28, 1942.   H. F. BAKEWELL   2,290,936
INTERNAL COMBUSTION ENGINE
Filed Dec. 17, 1940   2 Sheets-Sheet 1
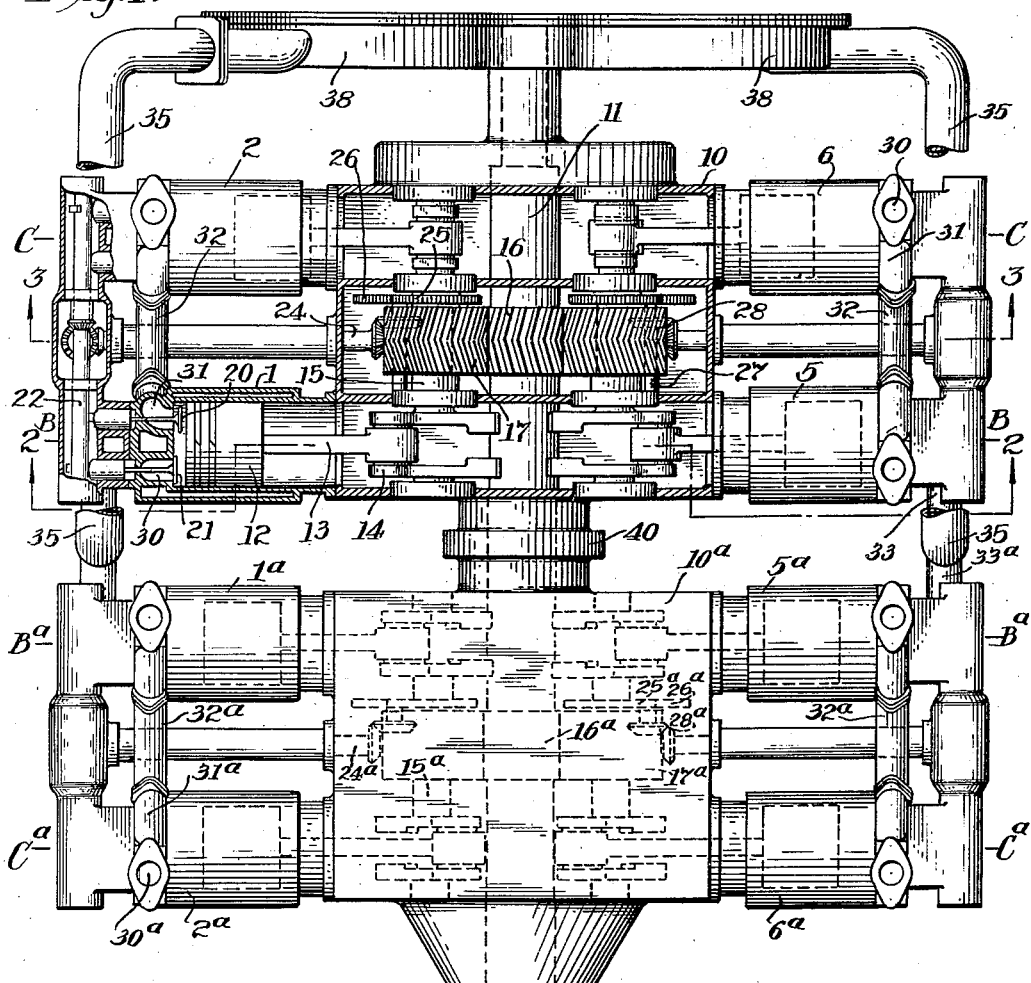
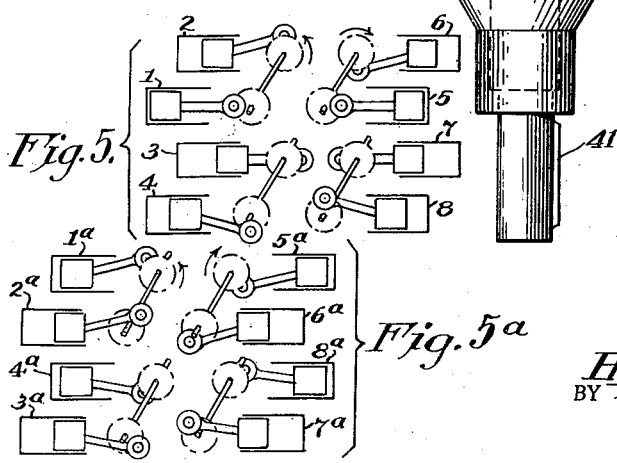
INVENTOR.
Harding F. Bakewell,
BY R. W. Smith

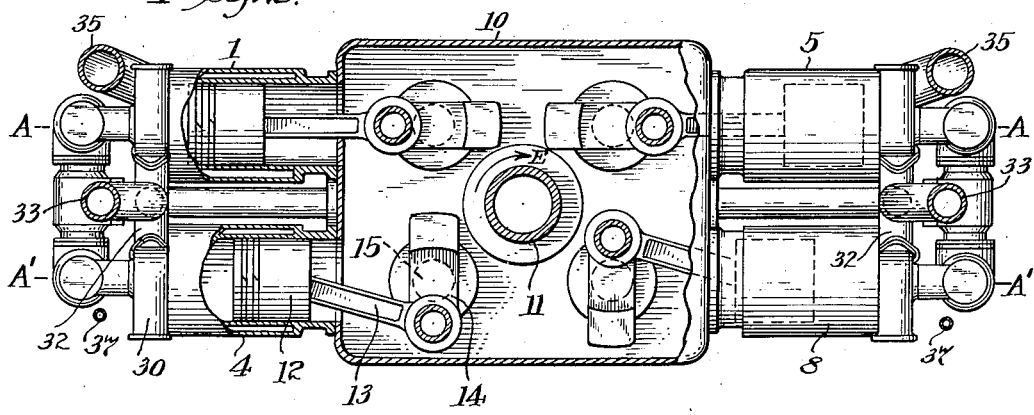
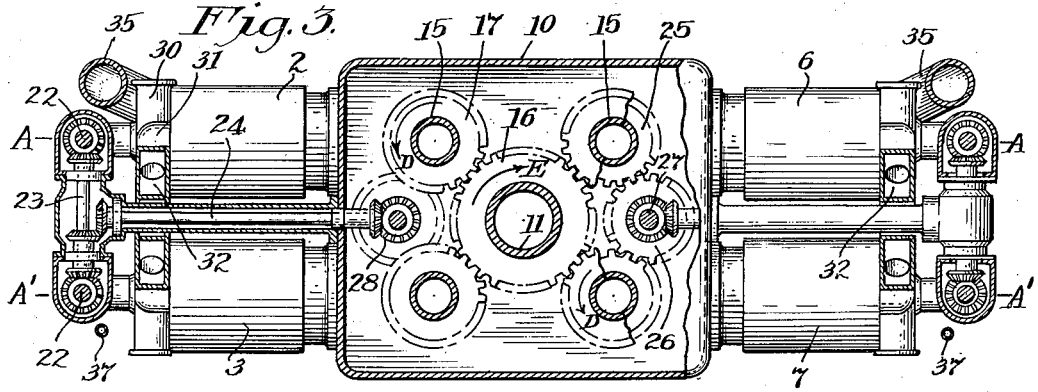
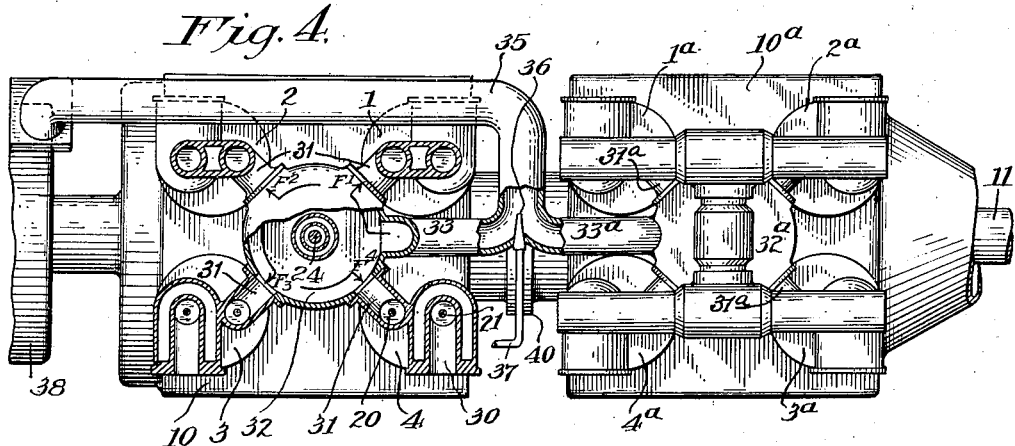

Patented July 28, 1942

2,290,936

UNITED STATES PATENT OFFICE 2,290,936

INTERNAL COMBUSTION ENGINE

Harding F. Bakewell, San Marino, Calif.

Application December 17, 1940, Serial No. 370,499

19 Claims. (Cl. 123—52)

This invention is a multi-cylinder internal combustion engine; and has for an object to provide for flow of combustible mixture so that it continuously advances to successive intake connections for a plurality of cylinders.

It is a further object of the invention to provide for balanced operation of an engine unit comprising a plurality of cylinders and adapted for continuously advancing flow of combustible mixture to the intake connections for the respective cylinders.

It is a still further object of the invention to provide for balanced operation of an engine comprising a plurality of these engine units, each having an intake manifold adapted for continuously advancing flow of combustible mixture to the intake connections for the cylinders of the unit.

It is a still further object of the invention to provide an engine adapted for balanced operation and continuously advancing flow of combustible mixture, and forming a shallow engine construction particularly adapted for mounting in the wing of an airplane for driving a propeller which projects beyond the wing.

More particularly, it is an object of the invention to provide an engine assembly adapted for four-cycle operation and comprising a pair of four-cylinder units projecting laterally from opposite sides of a common drive shaft, and providing balanced operation, with an intake manifold for each unit adapted for continuously advancing flow of combustible mixture to the intake connections for the respective cylinders of the unit, and with the four cylinders of each unit adapted for successive firing, with the firing of the series of cylinders of one unit alternating with firing the series of cylinders of the other unit.

It is a still further object of the invention to mount a plurality of these engine assemblies on a common drive shaft, one beyond another, with the assemblies balancing one another and with the time interval between successive firings of each assembly uniformly divided by firing a cylinder of each of the other assemblies.

Further objects of the invention will be readily understood from the following description of the accompanying drawings which illustrate a preferred form which the invention may assume in practice, it being understood that the form which is shown and described is for the purpose of illustration, and that the invention may be modified and is entitled to various forms without departing from the scope of the appended claims.

In the drawings:

Fig. 1 is a plan view of the invention, partly in section.

Figs. 2 and 3 are transverse sections on the lines 2—2 and 3—3 respectively of Fig. 1.

Fig. 4 is a side elevation of the invention, partly in section.

Fig. 5 is a diagram showing relative piston-stroke of the cylinders of one engine assembly.

Fig. 5a is a similar diagram of a second engine assembly, mounted on a common drive shaft in front of the first engine assembly, and showing relative piston-stroke of the two assemblies.

The engine comprises one or more assemblies, one beyond another along a common drive shaft when a plurality of assemblies are employed; and each assembly preferably comprises a pair of engine units projecting laterally at opposite sides of the drive shaft. The illustrated embodiment is that of an engine comprising two engine assemblies; and that assembly which is rearwardly along the common drive shaft will first be described.

This engine assembly comprises a crank case 10 in which a drive shaft 11 is journaled. An engine unit projects laterally from each of opposite sides of the crank case; and each unit comprises four cylinders projecting laterally from the drive shaft on parallel axes, with each cylinder of one unit axially alined transversely of the drive shaft with a cylinder of the other unit.

The cylinders of each unit are arranged in pairs. One pair of cylinders of each unit have their axes at right angles to the axis of the drive shaft 11 and in a plane A—A, which plane is above and parallel with the plane of the axis of the drive shaft; and the second pair of cylinders of each unit have their axes at right angles to the axis of the drive shaft 11 and in a plane A'—A', which plane is below and parallel with the plane of the axis of the drive shaft. The cylinders of each pair have their axes in the transverse planes B—B and C—C respectively, these planes being spaced along the drive shaft 11.

Pistons 12 reciprocate in the respective cylinders, and are connected by connecting rods 13 to crank throws 14 of crank shafts 15 which have driving connections with the shaft 11. One of the crank shafts is provided for each of the aforementioned pairs of cylinders of each unit. The four crank shafts are journaled in the crank case 10 parallel to the drive shaft 11; and the two crank shafts for each engine unit are at that side of the drive shaft from which the unit projects, and are in the planes A—A and A'—A' respectively. A pair of the crank throws 14 is provided on each crank shaft in alinement with the axes of the two cylinders which constitute a pair of the cylinders.

A gear 16 is fixed on the drive shaft 11 and meshes with gears 17 on the crank shafts 15, with these driving connections medially of the length of the crank shafts between the two crank throws of each crank shaft. The pistons rotate the crank shafts in the direction of arrows D, thereby rotating the drive shaft 11 in the direction of arrow E, with the crank shafts of the respective engine units applying power at opposite sides of the axis of the drive shaft, and with the crank shafts of each engine unit respectively applying power above and below the axis of the drive shaft.

In the illustrated embodiment of the invention the engine is adapted for four-cycle operation; and the four crank throws for each engine unit are preferably uniformly relatively offset around their crank shafts, and the crank throws for the cylinders, one from each of the engine units, which are axially alined transversely of the drive shaft 11, are relatively offset around their crank shafts so as to balance one another.

For example, with the cylinders of the two engine units respectively designated 1—2—3—4 and 5—6—7—8; and with the cylinders 1—2—5—6 and 3—4—7—8 respectively in the planes A—A and A'—A', and with the cylinders 1—4—5—8 and 2—3—6—7 respectively in the planes B—B and C—C, the crank throws of the respective engine units are successively rearwardly offset 90° in the order 1—2—3—4 and 5—6—7—8, with 180° relative offset of the crank throws for the cylinders 1—5, 2—6, 3—7 and 4—8.

The firing order is such as to successively fire the cylinders of one engine unit during one-half of the four-cycle operation, and then successively fire the cylinders of the other unit during the other half of the four-cycle operation. For example, with the above described designation for the respective cylinders, firing is in the order 1—2—3—4—5—6—7—8. Intake of combustible mixture to the cylinders is thus in this same order, i. e. the combustible mixture is first successively supplied to the cylinders of one engine unit and is then successively supplied to the cylinders of the other unit.

Each cylinder has intake and exhaust valves 20—21, which are preferably actuated by an overhead cam shaft 22. There is preferably one of these cam shafts for each of the pairs of cylinders; and the two cam shafts for each of the engine units may be driven by a common shaft 23 which in turn may be driven by a shaft 24. The shafts 24 for the respective engine units project laterally from opposite sides of the crank case 10, and are preferably each driven by one of the crank shafts 15 of the engine unit. As an instance a gear 25 may be fixed to one of the crank shafts of each engine unit, with the gears 25 meshing with gears 26 on countershafts 27. These countershafts are journaled in the crank case 10 at opposite sides of and parallel with the drive shaft 11, and have bevel gear driving connections 28 with the respective shafts 24.

Each exhaust valve 21 communicates with an exhaust port 30, and the exhaust ports for the cylinders of each engine unit may be connected to a common exhaust manifold (not shown). Each intake valve 20 communicates with an intake port 31, and the intake ports for the cylinders of each engine unit are connected to an intake manifold 32, there being one of these intake manifolds for each engine unit.

As best shown at Fig. 4, the cylinders of each engine unit are grouped so that their intake ports 31 are equidistantly spaced around a circumference, and the cooperating intake manifold 32 is annular and concentric with this circumference and immediately adjacent the intake ports of the engine unit, for circumferentially spaced direct communication with these intake ports. Supply of combustible mixture to the annular intake manifold is at a circumferential point adapting the combustible mixture, when flow in the annular manifold has once started, for continuously advancing flow to the respective intake connections for the cylinders of the engine unit, until the combustible mixture has been successively admitted to all of the cylinders. For example, when (as previously described) intake of combustible mixture is in the cylinder order 1—2—3—4—5—6—7—8, a supply conduit 33 communicates with each of the intake manifolds 32, between the connections for the first and last firing cylinders of each unit, i. e. between the cylinders 1—4 and 5—8 respectively.

When the intake valve of the cylinder 1 opens, flow of combustible mixture is thus in the direction of arrow $F^1$ to the intake connection for this cylinder, and the intake valves of the cylinders 2—3—4 then successively open so that there is continuously advancing flow in the direction of arrows $F^2$—$F^3$—$F^4$ to the intake connections for these cylinders before the flow in the intake manifold stops at the end of this series of intake strokes. In similar manner, as the intake valves for the cylinders 5—6—7—8 then successively open, there is continuously advancing flow in the intake manifold for this engine unit, to the respective intake connections for these cylinders.

The combustible mixture is preferably formed by fuel injection. As an instance, air under pressure may be supplied via conduits 35 to the respective supply conduits 33, and fuel is injected into the respective conduits 35 via nozzles 36 which are respectively connected to fuel supply conduits 37. Air under pressure may be supplied to the conduits 35 by superchargers 38 which may be driven by the drive shaft 11.

The construction as described, provides for uniform and maximum admission of combustible mixture to the cylinders by providing for continuously advancing flow to the intake connections for successively opening intake valves of the respective cylinders of each engine unit, and also provides balanced operation by uniformly relatively offsetting the crank throws of each engine unit and balancing the crank throws of the two engine units, with the pairs of cylinders of each engine unit alternately applying power to the drive shaft at the planes A—A and A'—A' which are respectively above and below the drive shaft, and with the two engine units alternately applying power at opposite sides of the drive shaft.

The second engine assembly, which in the illustrated embodiment is mounted on the drive shaft 11 in front of the assembly above described, is of similar construction and is therefore designated by the same reference numerals, with the exponent a.

The crank cases 10—10a may be connected by a coupling 40, with the common drive shaft 11 projecting beyond the remote ends of the connected crank cases. A driving connection is provided at one end of the drive shaft, and is shown as a driving connection 41 for the propeller of an airplane; and the superchargers 38 are preferably mounted on the opposite end of the drive shaft.

The pairs of cylinders of the second engine assembly are in the same planes A—A and A'—A' as the pairs of cylinders of the first described assembly; and the respective cylinders of each pair of cylinders of the second assembly are in planes $B^a$—$B^a$ and $C^a$—$C^a$, with the planes B—B and $B^a$—Ba preferably proximate one another so that the planes C—C and $C^a$—$C^a$ are remote from one another.

The crank throws for the plurality of engine assemblies are relatively offset so as to balance one another, with the time interval between successive firings of one assembly preferably uniformly divided by firing a cylinder of each of the other assemblies. As an instance, in the illustrated embodiment which comprises two engine assemblies, the cylinders of the two assemblies fire alternately at uniformly spaced intervals. For example, and as shown at Figs. 5 and 5a, the crank throws of the first described engine assembly (each unit of which has its crank throws successively offset 90°) are offset 45° in advance of the respective crank throws of the second engine assembly (each unit of which also has its crank throws successively offset 90°).

To illustrate the preferred relative position of the alternately firing cylinders of the two engine assemblies, the two engine units 1a—2a—3a—4a and 5a—6a—7a—8a of the second engine assembly are respectively alined longitudinally of the drive shaft with the units 1—2—3—4 and 5—6—7—8 of the first engine assembly; and the the cylinders 1a—2a—5a—6a and 3a—4a—7a—8a are respectively in the planes A—A and A'—A'; and the cylinders 1a—4a—5a—8a and 2a—3a—6a—7a are respectively in the planes $B^a$—$B^a$ and $C^a$—$C^a$; and the firing order of the second engine assembly is 5a—6a—7a—8a—1a—2a—3a—4a. The firing order of the two engine assembles, firing alternately, is thus 1—5a—2—6a—3—7a—4—8a—
5—1a—6—2a—7—3a—8—4a Each engine assemly thus provides balanced operation as previously described; and the two engine assemblies are also balanced since (in the illustrated embodiment) the crank throws of each assembly are offset one-half the offset between crank throws of the other assembly, and cylinders one from each assembly alternately apply power at opposite sides of and in spaced relation along the drive shaft.

As explained in connection with the conduits 33 and the intake manifolds 32, the conduits 33a communicate with the intake manifolds 32a between the intake connections for the first and last firing cylinders of each engine unit so as to provide continuously advancing flow of combustible mixture to the cylinders of each unit which are successively at intake stroke. For example, with the cylinder designation and relative position as above described, the conduits 33a communicate with the intake manifolds 32a between the intake connections for the cylinders 1a—4a and 5a—8a respectively.

The supply conduits 33—33a which are at each side of the engine are thus proximate one another (Fig. 4), thereby adapting each pair of conduits 33—33a for air supply via a common conduit 35 and for fuel injection via a common nozzle 36. Combustible mixture is thus supplied via one of the conduits 33 for continuously advancing flow to all of the cylinders of the engine unit 1—2—3—4, and alternately with successive intake strokes of this engine unit combustible mixture is supplied via the conduit 33a at the opposite side of the engine, for continuously advancing flow to all of the cylinders of the engine unit 5a—6a—7a—8a; and then the combustible mixture is supplied via the conduit 33 at this last mentioned side of the engine, to all of the cylinders of the engine unit 5—6—7—8, and alternately with successive intake strokes of this engine unit combustible mixture is supplied via the conduit 33a at the first mentioned side of the engine, to all of the cylinders of the engine unit 1a—2a—3a—4a.

Flow is thus substantially continuous in each conduit 35, for first supplying combustible mixture via one of its branch conduits 33 or 33a to one engine unit in which the intake valves open in succession as the valve for each preceding cylinder closes, and for then supplying the combustible mixture via the other branch conduit 33a or 33 to another engine unit in which the intake valves also open in succession as the valve for each preceding cylinder closes.

I claim:

1. In an internal combustion engine, a drive shaft, a pair of engine units each comprising a plurality of cylinders having the axes of the cylinders of the respective engine units outwardly projecting at opposite sides of the drive shaft, a piston in each cylinder, operating connections between the pistons and the drive shaft, each operating connection including a crank throw, and an intake manifold for each engine unit having intake connections for the plurality of cylinders of the unit, the crank throws of each engine unit being successively uniformly offset for successive intake strokes in the cylinders of the unit in an order for continuously advancing flow along the intake manifold of the unit to the intake connections for the cylinders which are successively at intake stroke, and the crank throws of the pair of engine units being relatively positioned for simultaneous same stroke position in cylinders one from each engine unit.

2. In an internal combustion engine, a drive shaft, a pair of engine units each comprising a plurality of cylinders having the axes of the cylinders of the respective engine units outwardly projecting at opposite sides of the drive shaft, a piston in each cylinder, operating connections between the pistons and the drive shaft, each operating connection including a crank throw, and an intake manifold for each engine unit having intake connections for the plurality of cylinders of the unit, the crank throws of each engine unit being successively uniformly offset for successive intake strokes in the cylinders of the unit in an order for continuously advancing flow along the intake manifold of the unit to the intake connections for the cylinders which are successively at intake stroke, and the crank throws of the pair of engine units being relatively positioned for simultaneous same stroke position in cylinders one from each engine unit, and the series of successive intake strokes of one engine unit alternating with the series of successive intake strokes of the other engine unit.

3. In an internal combustion engine, a drive shaft, a pair of engine assemblies spaced along the drive shaft and each including an engine unit comprising a plurality of cylinders, a piston in each cylinder, operating connections between the pistons and the drive shaft, each operating connection including a crank throw, and an intake manifold for each engine unit having intake connections for the plurality of cylinders of the unit, the crank throws of each engine unit being relatively offset for successive intake strokes in the cylinders of the unit in an order for continuously advancing flow along the intake manifold of the unit to the intake connections for the cylinders which are successively at intake stroke, and the crank throws of the pair of engine assemblies being relatively offset so that intake strokes of the assemblies alternate.

4. In an internal combustion engine, a drive shaft, a pair of engine assemblies spaced along the drive shaft and each comprising a pair of engine units, each engine unit comprising a plurality of cylinders having the axes of the cylinders of the respective engine units of each engine assembly outwardly projecting at opposite sides of the drive shaft, a piston in each cylinder, operating connections between the pistons and the drive shaft, each operating connection including a crank throw, and an intake manifold for each engine unit having intake connections for the plurality of cylinders of the unit, the crank throws of each engine unit being relatively offset for successive intake strokes in the cylinders of the unit in an order for continuously advancing flow along the intake manifold of the unit to the intake connections for the cylinders which are successively at intake stroke, and the crank throws of the pair of engine units of each engine assembly being relatively positioned for simultaneous same stroke position in cylinders one from each engine unit of the engine assembly, and the crank throws for the pair of engine assemblies being relatively offset so that intake strokes of the assemblies alternate.

5. In an internal combustion engine, a drive shaft, a pair of engine assemblies spaced along the drive shaft and each comprising a pair of engine units, each engine unit comprising a plurality of cylinders having the axes of the cylinders of the respective engine units of each engine assembly outwardly projecting at opposite sides of the drive shaft, a piston in each cylinder, operating connections between the pistons and the drive shaft, each operating connection including a crank throw, and an intake manifold for each engine unit having intake connections for the plurality of cylinders of the unit, the crank throws of each engine unit being relatively offset for successive intake strokes in the cylinders of the unit in an order for continuously advancing flow along the intake manifold of the unit to the intake connections for the cylinders which are successively at intake stroke, and the crank throws of the pair of engine units of each engine assembly being relatively positioned for simultaneous same stroke position in cylinders one from each engine unit of the engine assembly, and the series of successive intake strokes of one unit of the engine assembly alternating with the series of successive intake strokes of the other unit of the engine assembly, and the crank throws for the pair of engine assemblies being relatively offset so that intake strokes of the assemblies alternate.

6. In an internal combustion engine, a drive shaft, a pair of parallel crank shafts in planes respectively above and below and parallel with the drive shaft, driving connections between the crank shafts and the drive shaft, two pairs of cylinders having their axes outwardly projecting at one side of the drive shaft, with the axes of the respective pairs of cylinders in said parallel planes and with the axes of the respective cylinders of the pairs in planes spaced along the drive shaft, pistons in the respective cylinders, a pair of crank throws on each crank shaft for a pair of the cylinders, connecting rods between the respective pistons and the respective crank throws, and an annular intake manifold overlying the outer ends of the cylinders and having circumferentially spaced intake connections for the respective cylinders, the crank throws being successively offset 90° for successive intake strokes in the cylinders in an order for continuously advancing flow around the intake manifold to the intake connections for the cylinders which are successively at intake stroke.

7. In an internal combustion engine, a drive shaft, a pair of parallel crank shafts at each of opposite sides of the drive shaft and in planes respectively above and below and parallel with the drive shaft, driving connections between the crank shafts and the drive shaft, a pair of engine units each comprising two pairs of cylinders with the axes of the cylinders of the respective engine units outwardly projecting at opposite sides of the drive shaft, and with the axes of the cylinders of the respective pairs of cylinders of each engine unit in said parallel planes and with the axes of the respective cylinders of the pairs in planes spaced along the drive shaft, pistons in the respective cylinders, a pair of crank throws on each crank shaft for a pair of the cylinders, connecting rods between the respective pistons and the respective crank throws, and an annular intake manifold overlying the outer ends of the cylinders of each engine unit and having circumferentially spaced intake connections for the respective cylinders of the unit, the crank throws for each engine unit being successively offset 90° for successive intake strokes in the cylinders of the unit in an order for continuously advancing flow around the intake manifold of the unit to the intake connections for the cylinders which are successively at intake stroke, and the crank throws of the pair of engine units being relatively offset 180°.

8. In an internal combustion engine, a drive shaft, a pair of parallel crank shafts at each of opposite sides of the drive shaft and in planes respectively above and below and parallel with the drive shaft, driving connections between the crank shafts and the drive shaft, a pair of engine units each comprising two pairs of cylinders with the axes of the cylinders of the respective engine units outwardly projecting at opposite sides of the drive shaft, and with the axes of the cylinders of the respective pairs of cylinders of each engine unit in said parallel planes and with the axes of the respective cylinders of the pairs spaced along the drive shaft, pistons in the respective cylinders, a pair of crank throws on each crank shaft for a pair of the cylinders, connecting rods between the respective pistons and the respective crank throws, and an annular intake manifold overlying the outer ends of the cylinders of each engine unit and having circumferentially spaced intake connections for the respective cylinders of the unit, the crank throws for each engine unit being successively offset 90° for successive intake strokes in the cylinders of the unit in an order for continuously advancing flow around the intake manifold of the unit to the intake connections for the cylinders which are successively at intake stroke, the crank throws of the pair of engine units being relatively offset 180°, and the series of successive intake strokes of one engine unit alternating with the series of successive intake strokes of the other engine unit.

9. In an internal combustion engine, a drive shaft, a pair of parallel crank shafts in planes respectively above and below and parallel with the drive shaft, driving connections between the crank shafts and the drive shaft, two pairs of cylinders having their axes outwardly projecting at one side of the drive shaft, with the axes of the respective pairs of cylinders in said parallel planes and with the axes of the respective cylinders of the pairs spaced along the drive shaft, pistons in the respective cylinders, a pair of crank throws on each crank shaft for a pair of the cylinders, connecting rods between the respective pistons and the respective crank throws, and an annular intake manifold overlying the outer ends of the cylinders and having circumferentially spaced intake connections for the respective cylinders, the crank throws being successively offset 90° for successive intake strokes in the cylinders in an order for continuously advancing flow around the intake manifold to the intake connections for the cylinders which are successively at intake stroke, the aforesaid construction being incorporated in one engine assembly, and a pair of said engine assemblies having their drive shafts forming a longitudinal continuation of a common drive shaft, with the cylinders of the pair of engine assemblies in the same parallel planes above and below the drive shaft, and with the crank throws of the pair of assemblies relatively offset so that the intake strokes of the assemblies alternate.

10. In an internal combustion engine, a drive shaft, a pair of parallel crank shafts at each of opposite sides of the drive shaft and in planes respectively above and below and parallel with the drive shaft, driving connections between the crank shafts and the drive shaft, a pair of engine units each comprising two pairs of cylinders with the axes of the cylinders of the respective engine units outwardly projecting at opposite sides of the drive shaft, and with the axes of the cylinders of the respective pairs of cylinders of each engine unit in said parallel planes and with the axes of the respective cylinders of the pairs in planes spaced along the drive shaft, pistons in the respective cylinders, a pair of crank throws on each crank shaft for a pair of the cylinders, connecting rods between the respective pistons and the respective crank throws, and an annular intake manifold overlying the outer ends of the cylinders of each engine unit and having circumferentially spaced intake connections for the respective cylinders of the unit, the crank throws for each engine unit being successively offset 90° for successive intake strokes in the cylinders of the unit in an order for continuously advancing flow around the intake manifold of the unit to the intake connections for the cylinders which are successively at intake stroke, and the crank throws of the pair of engine units being relatively offset 180°, the aforesaid construction comprising one engine assembly, and a pair of said engine assemblies having their drive shafts forming a longitudinal continuation of a common drive shaft, with the cylinders of the pair of engine assemblies in the same parallel planes above and below the drive shaft, and with the crank throws of the pair of assemblies relatively offset so that the intake strokes of the assemblies alternate.

11. In an internal combustion engine, a drive shaft, a pair of parallel crank shafts at each of opposite sides of the drive shaft and in planes respectively above and below and parallel with the drive shaft, driving connections between the crank shafts and the drive shaft, a pair of engine units each comprising two pairs of cylinders with the axes of the cylinders of the respective engine units outwardly projecting at opposite sides of the drive shaft, and with the axes of the cylinders of the respective pairs of cylinders of each engine unit in said parallel planes and with the axes of the respective cylinders of the pairs spaced along the drive shaft, pistons in the respective cylinders, a pair of crank throws on each crank shaft for a pair of the cylinders, connecting rods between the respective pistons and the respective crank throws, and an annular intake manifold overlying the outer ends of the cylinders of each engine unit and having circumferentially spaced intake connections for the respective cylinders of the unit, the crank throws for each engine unit being successively offset 90° for successive intake strokes in the cylinders of the unit in an order for continuously advancing flow around the intake manifold of the unit to the intake connections for the cylinders which are successively at intake stroke, the crank throws of the pair of engine units being relatively offset 180°, and the series of successive intake strokes of one engine unit alternating with the series of successive intake strokes of the other engine unit, the aforesaid construction comprising one engine assembly, and a pair of said engine assemblies having their drive shafts forming a longitudinal continuation of a common drive shaft, with the cylinders of the pair of engine assemblies in the same parallel planes above and below the drive shaft, and with the crank throws of the pair of assemblies relatively offset so that the intake strokes of the assemblies alternate.

12. In an internal combustion engine, a drive shaft, a pair of parallel crank shafts at each of opposite sides of the drive shaft and in planes respectively above and below and parallel with the drive shaft, driving connections between the crank shafts and the drive shaft, a pair of engine units each comprising two pairs of cylinders with the axes of the cylinders of the respective engine units outwardly projecting at opposite sides of the drive shaft, and with the axes of the cylinders of the respective pairs of cylinders of each engine unit in said parallel planes and with the axes of the respective cylinders of the pairs spaced along the drive shaft, pistons in the respective cylinders, a pair of crank throws on each crank shaft for a pair of the cylinders, connecting rods between the respective pistons and the respective crank throws, and an annular intake manifold overlying the outer ends of the cylinders of each engine unit and having circumferentially spaced intake connections for the respective cylinders of the unit, the crank throws for each engine unit being successively offset 90° for successive intake strokes in the cylinders of the unit in an order for continuously advancing flow around the intake manifold of the unit to the intake connections for the cylinders which are successively at intake stroke, the crank throws of the pair of engine units being relatively offset 180°, and the series of successive intake strokes of one engine unit alternating with the series of successive intake strokes of the other engine unit, the aforesaid construction comprising one engine assembly, and a pair of said engine assemblies having their drive shafts forming a longitudinal continuation of a common drive shaft, with the cylinders of the pair of engine assemblies in the same parallel planes above and below the drive shaft, and with the crank throws of the pair of assemblies relatively offset so that the intake strokes of the assemblies alternate, the intake strokes of each engine unit of one assembly alternating with the intake strokes of that engine unit of the other assembly which is at the opposite side of the drive shaft.

13. In an internal combustion engine, a drive shaft, a pair of parallel crank shafts at each of opposite sides of the drive shaft and in planes respectively above and below and parallel with the drive shaft, driving connections between the crank shafts and the drive shaft, a pair of engine units each comprising two pairs of cylinders with the axes of the cylinders of the respective engine units outwardly projecting at opposite sides of the drive shaft, and with the axes of the cylinders of the respective pairs of cylinders of each engine unit in said parallel planes and with the axes of the respective cylinders of the pairs spaced along the drive shaft, pistons in the respective cylinders, a pair of crank throws on each crank shaft for a pair of the cylinders, connecting rods between the respective pistons and the respective crank throws, and an annular intake manifold overlying the outer ends of the cylinders of each engine unit and having circumferentially spaced intake connections for the respective cylinders of the unit, the crank throws for each engine unit being successively offset 90° for successive intake strokes in the cylinders of the unit in an order for continuously advancing flow around the intake manifold of the unit to the intake connections for the cylinders which are successively at intake stroke, the crank throws of the pair of engine units being relatively offset 180°, and the series of successive intake strokes of one engine unit alternating with the series of successive intake strokes of the other engine unit, the aforesaid construction comprising one engine assembly, a pair of said engine assemblies having their drive shafts forming a longitudinal continuation of a common drive shaft, with the cylinders of the pair of engine assemblies in the same parallel planes above and below the drive shaft, and with the crank throws of the pair of assemblies relatively offset so that the intake strokes of the assemblies alternate, and a common supply conduit having connections with the annular intake manifolds of those engine units of the pair of engine assemblies which are at the same side of the drive shaft.

14. In an internal combustion engine, a drive shaft, a pair of parallel crank shafts at each of opposite sides of the drive shaft and in planes respectively above and below and parallel with the drive shaft, driving connections between the crank shafts and the drive shaft, a pair of engine units each comprising two pairs of cylinders with the axes of the cylinders of the respective engine units outwardly projecting at opposite sides of the drive shaft, and with the axes of the cylinders of the respective pairs of cylinders of each engine unit in said parallel planes and with the axes of the respective cylinders of the pairs spaced along the drive shaft, pistons in the respective cylinders, a pair of crank throws on each crank shaft for a pair of the cylinders, connecting rods between the respective pistons and the respective crank throws, and an annular intake manifold overlying the outer ends of the cylinders of each engine unit and having circumferentially spaced intake connections for the respective cylinders of the unit, the crank throws for each engine unit being successively offset 90° for successive intake strokes in the cylinders of the unit in an order for continuously advancing flow around the intake manifold of the unit to the intake connections for the cylinders which are successively at intake stroke, the crank throws of the pair of engine units being relatively offset 180°, and the series of successive intake strokes of one engine unit alternating with the series of successive intake strokes of the other engine unit, the aforesaid construction comprising one engine assembly, a pair of said engine assemblies having their drive shafts forming a longitudinal continuation of a common drive shaft, with the cylinders of the pair of engine assemblies in the same parallel planes above and below the drive shaft, and with the crank throws of the pair of assemblies relatively offset so that the intake strokes of the assemblies alternate, and a common supply conduit having connections with and at proximate sides of the annular intake manifolds of those engine units of the pair of engine assemblies which are at the same side of the drive shaft.

15. In an internal combustion engine, a drive shaft, a pair of parallel crank shafts at each of opposite sides of the drive shaft and in planes respectively above and below and parallel with the drive shaft, driving connections between the crank shafts and the drive shaft, a pair of engine units each comprising two pairs of cylinders with the axes of the cylinders of the respective engine units outwardly projecting at opposite sides of the drive shaft, and with the axes of the cylinders of the respective pairs of cylinders of each engine unit in said parallel planes and with the axes of the respective cylinders of the pairs spaced along the drive shaft, pistons in the respective cylinders, a pair of crank throws on each crank shaft for a pair of the cylinders, connecting rods between the respective pistons and the respective crank throws, and an annular intake manifold overlying the outer ends of the cylinders of each engine unit and having circumferentially spaced intake connections for the respective cylinders of the unit, the crank throws for each engine unit being successively offset 90° for successive intake strokes in the cylinders of the unit in an order for continuously advancing flow around the intake manifold of the unit to the intake connections for the cylinders which are successively at intake stroke, the crank throws of the pair of engine units being relatively offset 180°, and the series of successive intake strokes of one engine unit alternating with the series of successive intake strokes of the other engine unit, the aforesaid construction comprising one engine assembly, and a pair of said engine assemblies having their drive shafts forming a longitudinal continuation of a common drive shaft, with the cylinders of the pair of engine assemblies in the same parallel planes above and below the drive shaft, and with the crank throws of the pair of assemblies relatively offset so that the intake strokes of the assemblies alternate, the intake strokes of each engine unit of one assembly alternating with the intake strokes of that engine unit of the other assembly which is at the opposite side of the drive shaft, and a common supply conduit having connections with and at proximate sides of the annular intake manifolds of those engine units of the pair of engine assemblies which are at the same side of the drive shaft.

16. In an internal combustion engine, a drive shaft, a plurality of cylinders having their axes outwardly projecting at one side of the drive shaft so that in a plane transverse to said axes they are spaced around a circumference, a piston in each cylinder, operating connections between the pistons and the drive shaft, each operating connection including a crank throw, and an annular intake manifold having circumferentially spaced intake connections for the respective cylinders, the crank throws being successively uniformly offset for successive intake strokes in the cylinders in an order for continuously advancing flow around the intake manifold to the intake connections for the cylinders which are successively at intake stroke.

17. In an internal combustion engine, a drive shaft, a pair of engine units each comprising a plurality of cylinders having the axes of the cylinders of the respective engine units outwardly projecting at opposite sides of the drive shaft so that in a plane transverse to the axes of the cylinders of each engine unit said axes are spaced around a circumference, a piston in each cylinder, operating connections between the pistons and the drive shaft, each operating connection including a crank throw, and an annular intake manifold for the cylinders of each engine unit having circumfernetially spaced intake connections for the respective cylinders of the unit, the crank throws for each engine unit being successively uniformly offset for successive intake strokes in the cylinders of the unit in an order for continuously advancing flow around the intake manifold of the unit to the intake connections for the cylinders which are successively at intake stroke, and the crank throws of the pair of engine units being relatively positioned for simultaneous same stroke position in cylinders one from each engine unit.

18. In an internal combustion engine, a drive shaft, a pair of engine units each comprising a plurality of cylinders having the axes of the cylinders of the respective engine units outwardly projecting at opposite sides of the drive shaft so that in a plane transverse to the axes of the cylinders of each engine unit said axes are spaced around a circumference, a piston in each cylinder, operating connections between the pistons and the drive shaft, each operating connection including a crank throw, and an annular intake manifold for the cylinders of each engine unit having circumferentially spaced intake connections for the respective cylinders of the unit, the crank throws for each engine unit being successively uniformly offset for successive intake strokes in the cylinders of the unit in an order for continuously advancing flow around the intake manifold of the unit to the intake connnections for the cylinders which are successively at intake stroke, the crank throws of the pair of engine units being relatively positioned for simultaneous same stroke position in cylinders one from each engine unit, and the series of successive intake strokes of one engine unit alternating with the series of successive intake strokes of the other engine unit.

19. In an internal combustion engine, a drive shaft, a pair of engine assemblies spaced along the drive shaft and each including an engine unit comprising a plurality of cylinders having their axes outwardly projecting at one side of the drive shaft so that in a plane transverse to said axes they are spaced around a circumference, a piston in each cylinder, operating connections between the pistons and the drive shaft, each operating connection including a crank throw, and an annular intake manifold for the cylinders of each engine unit having circumferentially spaced intake connections for the respective cylinders of the unit, the crank throws for each engine unit being successively uniformly offset for successive intake strokes in the cylinders of the unit in an order for continuously advancing flow around the intake manifold of the unit to the intake connections for the cylinders which are successively at intake stroke, and the crank throws for the pair of engine assemblies being relatively offset so that intake strokes of the assemblies alternate.

HARDING F. BAKEWELL.